United States Patent
Izumi et al.

(10) Patent No.: US 10,241,349 B2
(45) Date of Patent: Mar. 26, 2019

(54) IMAGE STABILIZATION APPARATUS, LENS APPARATUS, AND IMAGING APPARATUS

(71) Applicant: CANON KABUSHIKI KAISHA, Tokyo (JP)

(72) Inventors: Mitsuhiro Izumi, Yokohama (JP); Youji Ochi, Tokyo (JP); Kohei Uemura, Tokyo (JP); Kaori Miyoshi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/692,060

(22) Filed: Aug. 31, 2017

(65) Prior Publication Data

US 2018/0067336 A1 Mar. 8, 2018

(30) Foreign Application Priority Data

Sep. 6, 2016 (JP) .................. 2016-173261

(51) Int. Cl.
  *G02B 27/64* (2006.01)
  *G02B 7/02* (2006.01)
  *H04N 5/232* (2006.01)

(52) U.S. Cl.
  CPC .......... *G02B 27/646* (2013.01); *G02B 7/021* (2013.01); *H04N 5/2328* (2013.01)

(58) Field of Classification Search
  CPC .......... H04N 5/23283; H04N 5/23287; H04N 5/2328; G02B 27/646; G02B 27/64; G02B 27/644; G02B 7/021; G03B 2205/0007; G03B 2205/0023; G03B 2205/0038

USPC ................ 348/208.4, 208.7, 208.11
See application file for complete search history.

(56) References Cited

U.S. PATENT DOCUMENTS

| | | | |
|---|---|---|---|
| 8,743,487 B2 | 6/2014 | Miyoshi | |
| 9,164,255 B2 | 10/2015 | Uemura | |
| 9,348,110 B2 | 5/2016 | Uemura | |
| 9,470,904 B2 | 10/2016 | Nanba | |
| 2011/0032615 A1* | 2/2011 | Usui | G02B 27/646 |
| | | | 359/554 |
| 2011/0181740 A1* | 7/2011 | Watanabe | G03B 3/10 |
| | | | 348/208.2 |
| 2014/0354860 A1* | 12/2014 | Yuge | G02B 27/646 |
| | | | 348/241 |

(Continued)

FOREIGN PATENT DOCUMENTS

JP    2015-125246 A    7/2015

*Primary Examiner* — Albert H Cutler
(74) *Attorney, Agent, or Firm* — Venable LLP

(57) ABSTRACT

An image stabilization apparatus includes a first optical element configured to move in a direction different from an optical axis, a first driver including a first magnet magnetized in a first magnetized direction and a first coil and configured to drive the first optical element by an electromagnetic action, a second optical element configured to move in a direction different from the optical axis, and a second driver including a second magnet magnetized in a second magnetized direction and a second coil and configured to drive the second optical element by an electromagnetic action. The first magnet is disposed outside a second area onto which the second magnet is projected in the second magnetized direction and the second magnet is disposed outside a first area onto which the first magnet is projected in the first magnetized direction.

15 Claims, 11 Drawing Sheets

(56) References Cited

U.S. PATENT DOCUMENTS

| | | | |
|---|---|---|---|
| 2015/0098142 A1 | 4/2015 | Izumi | |
| 2015/0146024 A1* | 5/2015 | Takeuchi | G02B 27/646 |
| | | | 348/208.4 |
| 2015/0185494 A1 | 7/2015 | Nanba | |
| 2016/0127647 A1* | 5/2016 | Miyoshi | H04N 5/23287 |
| | | | 348/208.4 |
| 2017/0046818 A1* | 2/2017 | Kiyamura | H04N 5/2254 |
| 2017/0176765 A1* | 6/2017 | Sueoka | G02B 27/646 |

* cited by examiner

IMAGE STABILIZATION APPARATUS, LENS APPARATUS, AND IMAGING APPARATUS

BACKGROUND OF THE INVENTION

Field of the Invention

The present invention relates to an image stabilization apparatus that reduces an image blue caused by a hand shake, etc.

Description of the Related Art

The image stabilization apparatus has been conventionally known and reduces an image blur by moving the entire or part of the optical system in a direction orthogonal to an optical axis. The image stabilization apparatus is demanded to significantly move the optical system in order to correct a large image blur. Japanese Patent Laid-Open No. ("JP") 2015-125246 discloses a zoom lens that corrects a large image blur without degrading the optical performance through a shift correction and a tilt correction for the image blur correction with a plurality of corrective lens units.

In the zoom lens disclosed in JP 2015-125246, distances among the plurality of corrective lens units for an image stabilization may be small depending on situations. Usually, the corrective lens unit uses a so-called VCM that is driven by an electromagnetic action between a magnet and a coil. However, as the distances among the plurality of corrective lens units reduce, a leak magnetic flux from a magnet that drives one corrective lens unit negatively affects another corrective lens through a magnetic interference. As a result, the correcting accuracy may lower.

SUMMARY OF THE INVENTION

Accordingly, the present invention provides an image stabilization apparatus, a lens apparatus, and an imaging apparatus, which can reduce a magnetic interference among a plurality of corrective lens units and restrain degraded corrective accuracy.

An image stabilization apparatus according to one aspect of the present invention includes a first optical element configured to move in a direction different from an optical axis, a first driver including a first magnet magnetized in a first magnetized direction and a first coil and configured to drive the first optical element by an electromagnetic action, a second optical element configured to move in a direction different from the optical axis, and a second driver including a second magnet magnetized in a second magnetized direction and a second coil and configured to drive the second optical element by an electromagnetic action. The first magnet is disposed outside a second area onto which the second magnet is projected in the second magnetized direction and the second magnet is disposed outside a first area onto which the second magnet is projected in the first magnetized direction.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to this embodiment.

Figure 1:
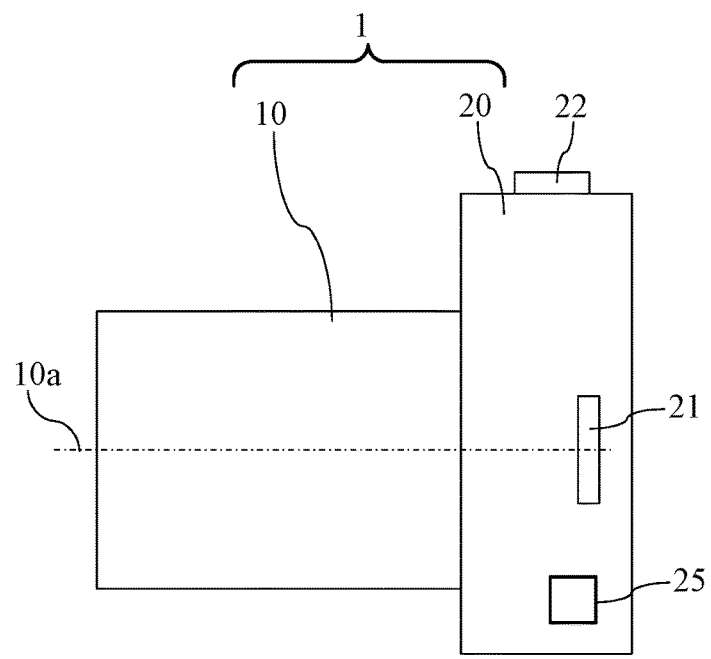
FIG. 1 is a sectional view of an imaging apparatus according to this embodiment.

Referring now to FIG. 1, an outline of an imaging apparatus according to this embodiment will be given. FIG. 1 is a sectional view of an imaging apparatus 1 viewed from its side. In this embodiment, the imaging apparatus 1 includes a camera body 20 (imaging apparatus body), and a lens barrel 10 (interchangeable lens or lens apparatus) attached to and detached from a camera body 20. However, this embodiment is not limited to this example and is applicable to an imaging apparatus in which the lens barrel 10 is integrated with the camera body 20.

An optical axis 10a corresponds to a center of an (imaging) optical system in the lens barrel 10. An imaging unit 21 provided in the camera body 20 includes an image sensor (photoelectric converter), such as a CMOS sensor, which photoelectrically converts an optical image (object image) formed by the lens barrel 10 and outputs an electric signal (image data). The imaging unit 21 is provided at a position that can image a light flux around the optical axis 10a as a center. This embodiment provides, but is not limited to, the imaging unit 21 in the camera body 20, and the imaging unit 21 may be provided to the lens barrel 10. An operating unit 22 includes a switch through which a user instructs an image capturing start or end. The user can switch an image capturing state between a still image and a motion image by operating an unillustrated setting unit on the camera body 20, etc. The camera body 20 includes a power supply for supplying the power, a storage unit for recording a captured image, etc. each of which is unillustrated.

The imaging apparatus 1 includes a CPU 25 (camera CPU or controller) that controls each component in the lens barrel 10 and the camera body 20. In this embodiment, the CPU 25 controls an operation of the image stabilization apparatus 11 so as to reduce a vibration detected by an unillustrated shake detector. Where the lens barrel 10 is an interchangeable lens, the lens barrel 10 may include a (lens) CPU. In this case, the CPU in the lens barrel 10 controls an operation in the image stabilization apparatus 11 via a communication with the CPU 25 based on the command from the CPU 25 in the camera body 20.

Figure 2:
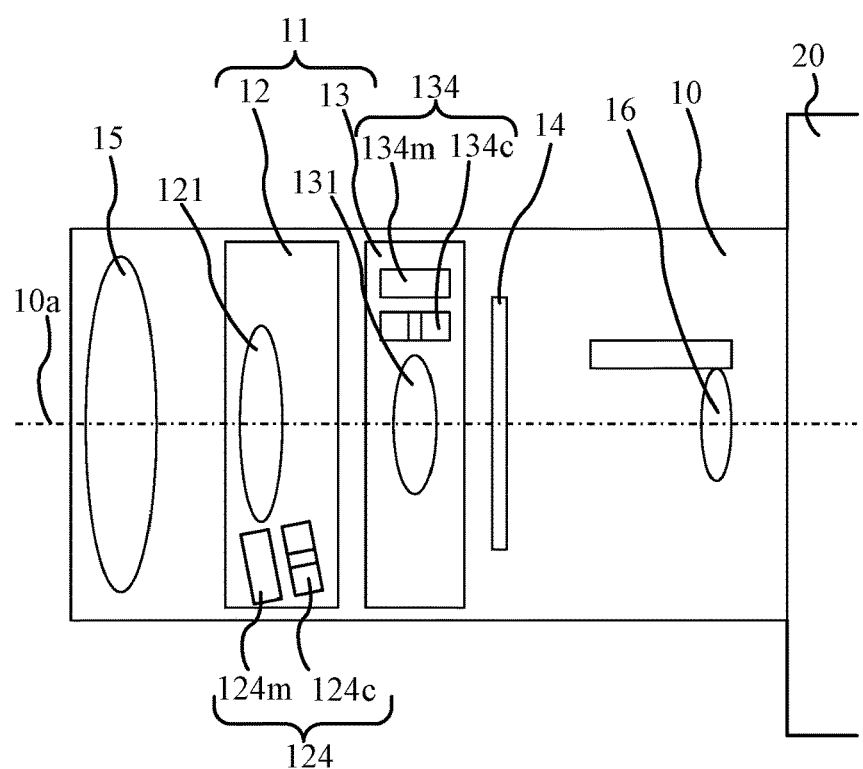
FIG. 2 is a sectional view of a lens barrel according to this embodiment.

Referring now to FIG. 2, a detailed description will be given of a configuration of the lens barrel 10. FIG. 2 is a sectional view of the lens barrel 10. The lens barrel 10 includes a plurality of lens units. The plurality of lens units determine a focal length of the lens barrel 10. Each lens unit moves back and force in a direction along the optical axis 10a (optical axis direction) and can change a focal length. When a front unit 15 (front lens unit) moves in a direction separating from the camera body 20 (towards the object), a long focal length can be realized. In order to maintain an in-focus state by which an image of the object located at a specific distance is formed on the imaging unit 21, a focus unit 16 moves back and forth in the optical axis direction. Thereby, objects located at a variety of distances can be formed on the imaging unit 21.

The image stabilization apparatus 11 moves a predetermined lens unit (corrective lens) in a direction orthogonal to the optical axis 10a and optically corrects an image blur so as to prevent or reduce the image blur caused by a user's hand shake. In this embodiment, the image stabilization apparatus 11 includes a first corrector 12 and a second corrector 13. A positional relationship between the first corrector 12 and the second corrector 13 in the optical axis direction varies according to a set focal length. In particular, when the longest focal point state is set, a distance between the first corrector 12 and the second corrector 13 becomes shortest. The configurations and operations of the first corrector 12 and the second corrector 13 will be described in detail later. A light shield unit 14 operates so as to transmit or shield a light flux from the object.

Figure 3:
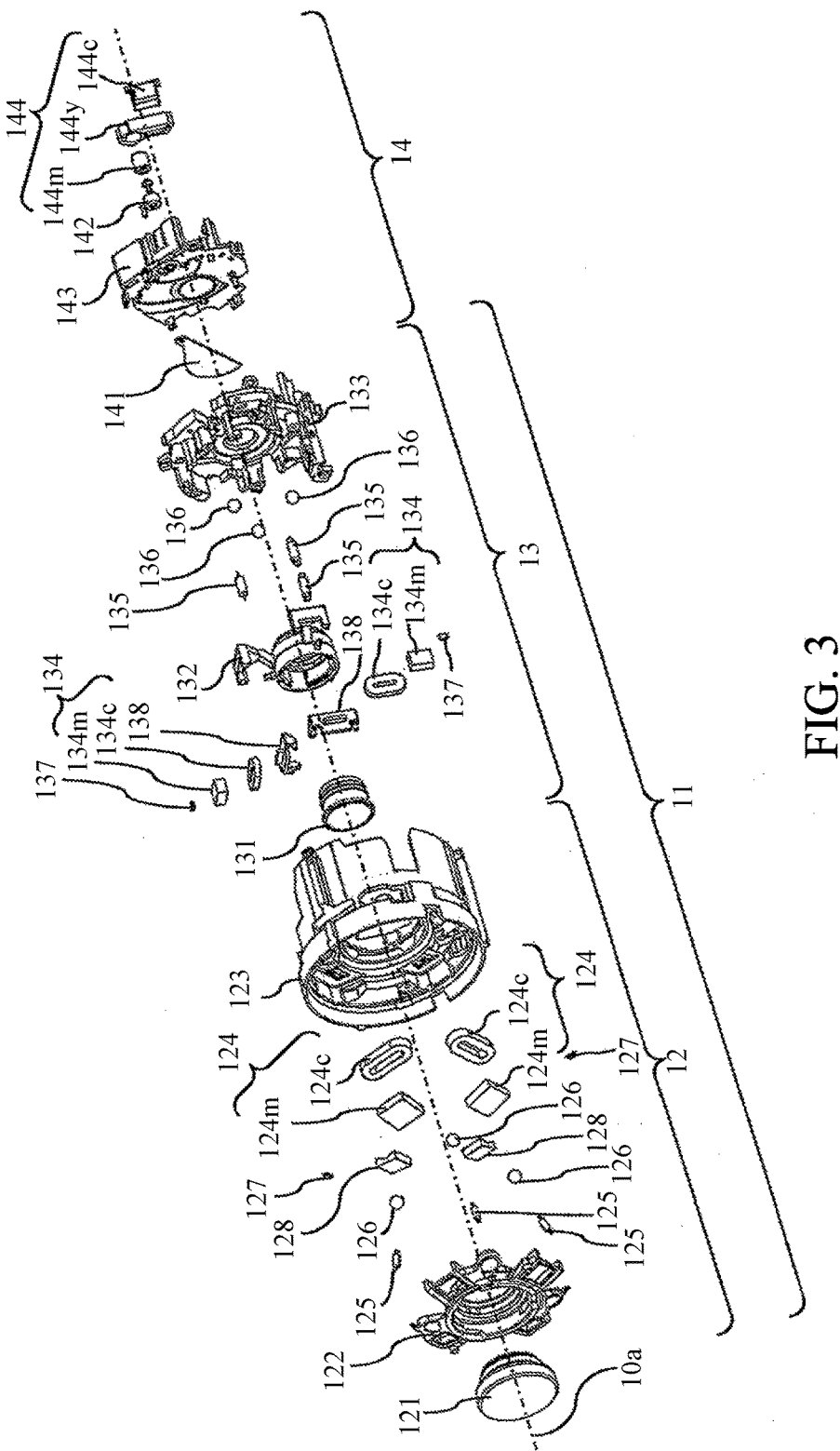
FIG. 3 is an exploded perspective view of an image stabilization apparatus and a light shielding member according to this embodiment.
Figure 4A:
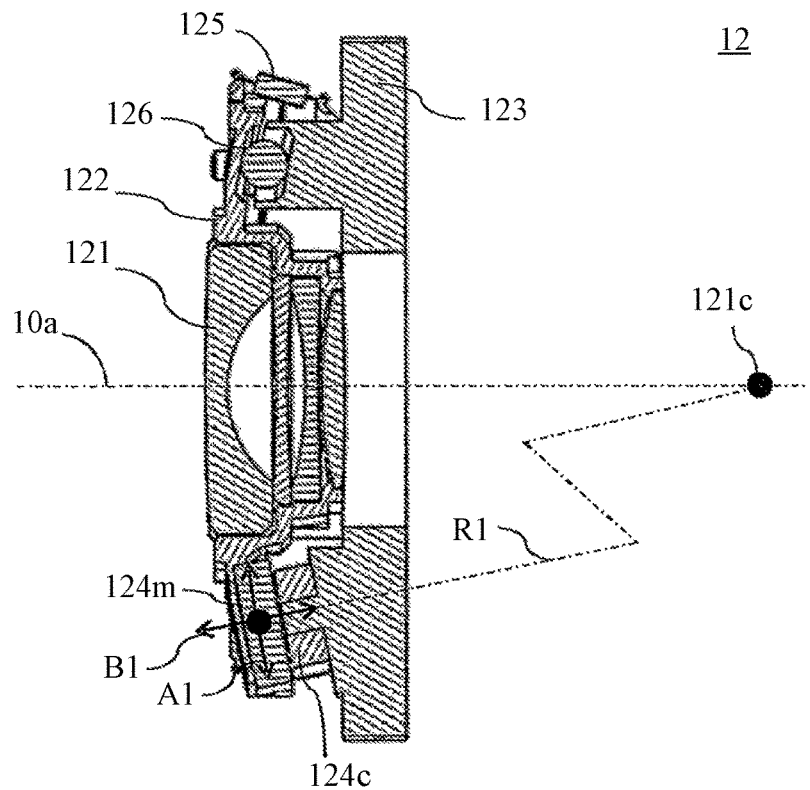
FIGS. 4A to 4C are sectional views of the image stabilization apparatus and the light shielding member according to this embodiment.
Figure 4B:
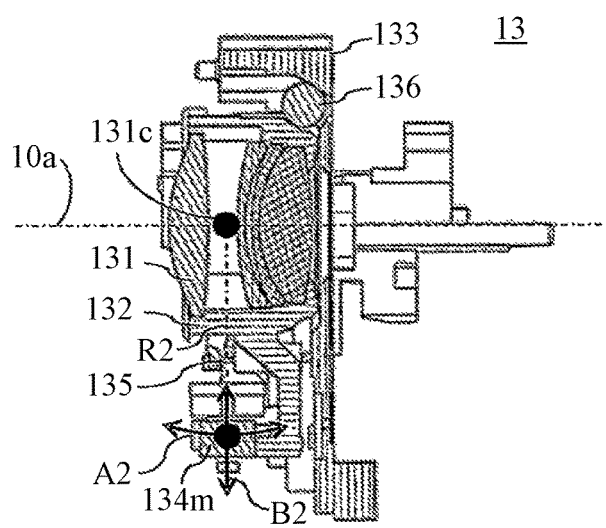
Figure 4C:
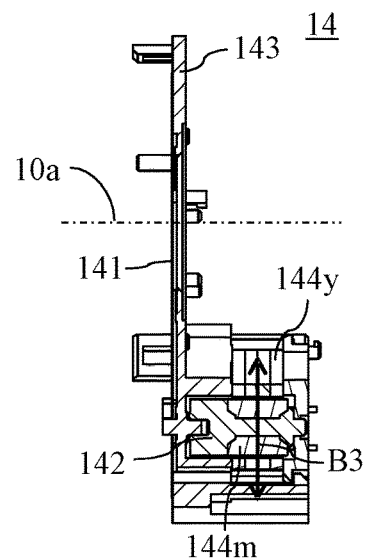

Referring now to FIGS. 3 and 4A to 4C, a description will be given of the image stabilization apparatus 11 (including the first corrector 12 and the second corrector 13) and the light shield unit 14. FIG. 3 is a perspective exploded view of the image stabilization apparatus 11 and the light shield unit 14. FIGS. 4A to 4C are sectional views of the image stabilization apparatus 11 and the light shield unit 14. FIGS. 4A to 4C are sectional views of the first corrector 12, the second corrector 13, and the light shield unit 14 taken along the optical axis 10a.

Referring now to FIGS. 3 and 4A, a description will be given of the first corrector 12. Reference numeral 121 denotes a first optical element that includes a plurality of lenses, and moves in a direction different from the optical axis 10a (or a direction orthogonal to the optical axis 10a) so as to correct an image blur. Reference numeral 122 denotes a first holder that is molded by resin etc., and holds the first optical element 121. The first holder 122 holds a first magnet 124m. Reference numeral 123 denotes a first fixing member molded by resin etc. and holds a first coil 124c having a linear portion. A first driver 124 includes the first magnet 124m and the first coil 124c. A driving force is generated in the first magnet 124c by an electromagnetic action that occurs when the first coil 124 is electrified. The first optical element 121 is driven by the driving force of the first driver 124.

The first corrector 12 includes two first drivers 124. The linear parts in the two first coils 124c face directions different from each other, and each linear part generates a force in a different direction due to an electromagnetic force. The two first drivers 124 are arranged to form an angle of about 90° around the optical axis 10a as a center when they are viewed in the optical axis direction. The two first drivers 124 can generate forces in directions orthogonal to each other, and move the first optical element 121 in a variety of directions. Reference numeral 126 denotes a spherical rolling ball that has a high hardness and is made of ceramic etc. The rolling ball 126 is sandwiched by spherical surfaces with first center points 121c as centers of the first holder 122 and the first fixing member 123. Thereby, the first holder 122 can move along the spherical surface relative to the first fixing member 123. Reference numeral 125 denotes a biasing member that includes a coil-shaped tension spring. The biasing member 125 applies a force so as to hold the rolling ball 126 between the first holder 122 and the first fixing member 123. Thereby, the first holder 122 can move without floating.

Reference numeral 127 denotes a first magnetism detector provided to the first fixing member 123. The first magnetism detector 127 detects a change of a magnetic field as a detection magnet 128 provided to the first holder 122 moves. The change of the magnetic field is detected and can be converted into a moving amount of the first holder 122. The center of the first magnet 124m is located apart from the first center point 121c by a distance of a first radius R1. The center of the first magnet 124m has the first center point 121c on the optical axis 10a and moves in a direction of an arrow A1 along a spherical surface of the first radius R1. The first magnet 124m is dipole-magnetized and the magnetized direction of the first magnet 124m is a first magnetized direction B1 from (the center of) the first magnet 124m to the first center point 121c. In this embodiment, the first radius R1 is set to an infinite value, but where the first radius R1 is infinite, the first magnet 124m moves to a direction orthogonal to the optical axis 10a. In this embodiment, one of the two first magnets 124m is described but this description is applicable to the other of the two first magnets 124m, and the description thereof will be omitted.

Referring now to FIGS. 3 and 4B, the second corrector 13 will be described. Reference numeral 131 denotes a second optical element that includes a plurality of lenses and moves in a direction different from the optical axis 10a (or a direction orthogonal to the optical axis 10a) so as to correct an image blur. Reference numeral 132 denotes a second holder that holds the second optical element 131 and is molded by resin etc. The second holder 132 holds the second magnet 134m. Reference numeral 133 is a second fixing member that is molded by resin etc. and holds the second coil 134c having a linear part via the coil holder 138. The second driver 134 includes a second magnet 134m and a second coil 134c, and generates a driving force in the second magnet 134m due to the electromagnetic action generated as the second coil 134c is electrified. The driving force of the second driver 134 drives the second optical element 131.

The second corrector 13 includes two second drivers 134. The linear parts in the two first coils 134c face directions different from each other, and each linear part generates a force in a different direction due to an electromagnetic force. The two second drivers 134 are arranged to form an angle of about 90° around the optical axis 10a as a center when they are viewed in the optical axis direction. The two first drivers 134 can generate forces in directions orthogonal to each other, and move the second optical element 131 in a variety of directions. Reference numeral 136 denotes a spherical rolling ball that has a high hardness and is made of ceramic etc. The rolling ball 136 is sandwiched by spherical surfaces having the same centers (with second center points 131c as centers) of the second holder 132 and the second fixing member 133. Thereby, the second holder 132 can move along the spherical surface relative to the second fixing member 133. Reference numeral 135 denotes a biasing member that includes a coil-shaped tension spring. The biasing member 135 applies a force so as to hold the rolling ball 136 between the second holder 132 and the second fixing member 133. Thereby, the second holder 132 can move without floating. Usually, the biasing member 135 is made of a metallic material, but may be made of a magnetic material. An end of the biasing member 135 moves as the second optical element 131 moves.

Reference numeral 137 denotes a second magnetism detector provided to the second fixing member 133. The second magnetism detector 137 detects a change of a magnetic field as a second magnet 134m provided to the second holder 132 moves. The change of the magnetic field is detected and can be converted into a moving amount of the second holder 132. The center of the second magnet 134m is located apart from the second center point 131c by a distance of a second radius R2. The center of the second magnet 134m has the second center point 131c on the optical axis 10a and moves in a direction of an arrow A2 along the spherical surface of the second radius R2. The second magnet 134m is dipole-magnetized and the magnetized direction of the second magnet 134m is a second magnetized direction B2 from (the center of) the second magnet 134m to the second center point 131c.

Referring now to FIGS. 3 and 4C, the light shield unit 14 will be described. Reference numeral 141 denotes a light shielding member that has a thin film shape, and shields light by moving in a direction different from the optical axis 10a (or a direction orthogonal to the optical axis 10a). The light shielding member 141 rotates so as to transmit or restrict (or shield) a light flux from the object. The light shielding member 141 can be used as a shutter for image capturing. Reference numeral 143 denotes a fixing member that rotatably holds the light shielding member 141. Reference numeral 142 is a drive shaft fixed coaxially with the third magnet 144m. The light shielding member 142 can be rotated by rotating the drive shaft 142.

Reference numeral 144y denotes a yoke made of a magnetic material. The yoke 144y transmits a magnetic flux that is generated by electrifying the third coil 144c, to a vicinity of the third magnet 144m. The third magnet 144m, the third coil 144c, and the yoke 144y constitute a third driver 144 configured to drive the light shielding member 141. The third magnet 144m is driven by the electromagnetic action generated by electrifying the third coil 144c. The third magnet 144m is magnetized in a direction orthogonal to the optical axis 10a. Thus, the magnetized direction of the third magnet 144m is a direction of an arrow B3 orthogonal to the optical axis 10a.

Figure 5A:
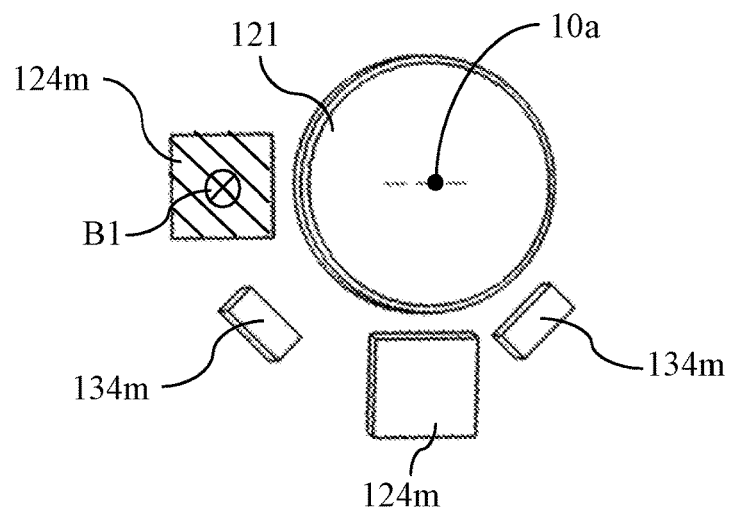
FIGS. 5A and 5B are explanatory views of a positional relationship between a first magnet in a first corrector and a second magnet in a second corrector according to this embodiment.
Figure 5B:
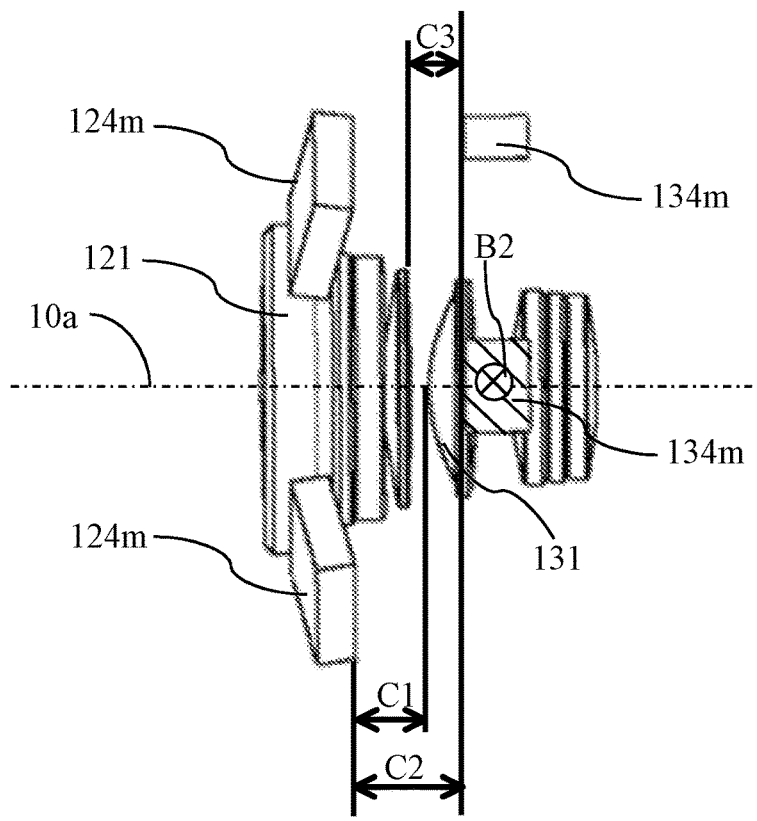

Referring now to FIGS. 5A and 5B, a description will be given of a positional relationship between the first magnet 124m in the first corrector 12 and the second magnet 134m in the second corrector 13 in the image stabilization apparatus 11. FIGS. 5A and 5B are explanatory views of the positional relationship between the first magnet 124m and the second magnet 134m. FIG. 5A is a configuration diagram of a principal part in the image stabilization apparatus 11 viewed from the first magnetized direction B1 for one of the first magnets 124m. FIG. 5B is a configuration diagram of a principal part in the image stabilization apparatus 11 viewed from the second magnetized direction B2 for one of the second magnets 134m.

Since each of the two first magnets 124m is magnetized in the first magnetized direction B1, the magnetic force is more influential in the first magnetized direction B1. In FIG. 5A, an external form of one of the first magnets 124m is hatched. Since FIG. 5A is a view of the first magnet 124m viewed from the first magnetized direction B1, the magnetic force is more influential in an area on the hatched part in the depth direction of the paper. Accordingly, in this embodiment, the second magnet 134m is not disposed in a first area onto which the external form of the first magnet 124m is projected in the first magnetized direction B1 (within the hatched part in FIG. 5A). In other words, the second magnet 134m is disposed outside the first area onto which the external form of the first magnet 124m is projected in the first magnetized direction B1 (outside the hatched part in FIG. 5A). Thus, the magnetic force of the first magnet 124m is less influential on the second magnet 134m.

In FIG. 5B, the external form of one of the second magnets 134m is hatched. Since FIG. 5B is a view of the second magnet 134m viewed from the second magnetized direction B2, the magnetic force is more influential in the area of the hatched part in the depth direction of the paper. Accordingly, in this embodiment, the first magnet 124m is not disposed in a second area onto which the external form of the second magnet 134m is projected in the second magnetized direction B2 (within the hatched part in FIG. 5B). In other words, the first magnet 124m is disposed outside the second area onto which the external form of the second magnet 134m is projected in the second magnetized direction B2 (outside the hatched part in FIG. 5B). Thus, the magnetic force of the second magnet 134m is less influential on the first magnet 124m.

Thus, this embodiment arranges the first magnet 124m and the second magnet 134m so as to reduce the influence of the mutual magnetic forces (the magnetic interference). This configuration reduces the magnetic interference generated between the first magnet 124m and the second magnet 134m and prevents or reduces the degraded correcting accuracy. There are two first magnets 124m and two second magnets 134m, and the description of one magnet is applicable to the other magnet.

Figure 11:
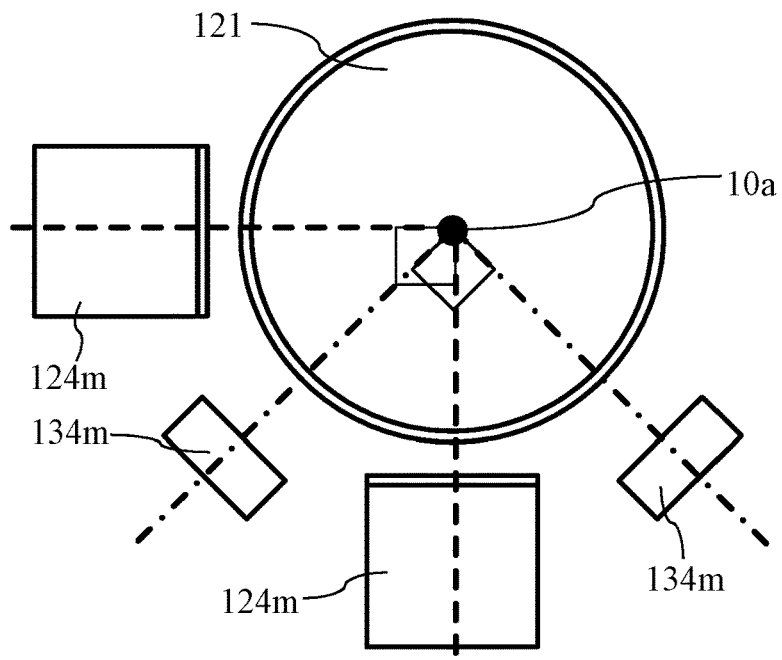
FIG. 11 is an explanatory view of a positional relationship between the first magnet and the second magnet according to this embodiment.

Referring now to FIG. 11, a description will be given of a positional relationship between the two first magnets 124m and the two second magnets 134m. FIG. 11 is an explanatory view of a positional relationship between the two first magnets 124m and the two second magnets 134m when the first corrector 12 and the second corrector 13 are viewed from the optical axis direction. The two first magnets 124m are arranged so as to form an angle of about 90° with the optical axis 10a as a center. Similarly, the two second magnets 134m are arranged so as to form an angle of about 90° with the optical axis 10a as a center. One of the first magnets 124m is held by the second magnets 134m, and one of the second magnets 134m is held by the first magnets 124m. Thereby, the two first magnets 124m and the two second magnets 134m can be arranged in a narrow area and the space in the lens barrel 10 can be effectively utilized.

Next follows a description of the positional relationship between the second magnet 134m and the third magnet 144m. As illustrated in FIG. 4B, the second magnet 134m is magnetized in the second magnetized direction B2 orthogonal to the optical axis 10a. As illustrated in FIG. 4C, the third magnet 144m is magnetized in the third magnetized direction B3 orthogonal to the optical axis 10a. The second corrector 13 having the second magnet 134m and the light shield unit 14 having the third magnet 144m are arranged in the direction along the optical axis 10a (optical axis direction). Hence, the second magnet 134m and the third magnet 144m are arranged along the optical axis direction so that they shift each other.

Thus, the third magnet 144m is not disposed in the second area onto which the external form of the second magnet 134m is projected in the second magnetized direction B2 (within the hatched part in FIG. 5B). In other words, the third magnet 144m is disposed outside the second area onto which the external form of the second magnet 134m is projected in the second magnetized direction B2 (outside the hatched part in FIG. 5B). The second magnet 134m is not disposed in a third area onto which the external form of the third magnet 144m is projected in the third magnetized direction B3. In other words, the second magnet 134m is disposed outside the third area onto which the external form of the third magnet 144m is projected in the third magnetized direction B3. Thus, in this embodiment, the second magnet 134m and the third magnet 144m are arranged so as to reduce the interference of the mutual magnetic forces or the magnetic interference. This configuration can reduce the magnetic interference generated between the second magnet 134m and the third magnet 144m, and restrains a drop of the correction accuracy.

FIG. 5B is a view of the second magnet 134m viewed from the magnetized direction (second magnetized direction B2), and corresponds to a side view of the image stabilization apparatus 11. FIG. 5B illustrates a non-operated state in which the image stabilization apparatus 11 is not operated and does not correct the image blur. As illustrated in FIG. 5B, in the optical axis direction in the non-operated state, the first magnet 124m, the second magnet 134m, the first optical element 121, and the second optical element 131 may be arranged so as to satisfy the following relationship. In other words, the first magnet 124m is disposed so that a distance of closest approach or the closest distance C2 between the first magnet 124m and the second magnet 134m is longer than a distance of closest approach or the closest distance C1 between the first magnet 124m and the second optical element 131 (or the surface of the second optical element 131 closest to the object). The second magnet 134m is disposed so that the distance of closest approach C2 between the first magnet 124m and the second magnet 134m is longer than a distance of closest approach or the closest distance C3 between the first optical element 121 (or the surface of the first optical element closest to the image) and the second magnet 134m. This configuration can make the first optical element 121 in the first corrector 12 and the second optical element 131 in the second corrector 13 as close as possible, and reduce the optical limitation. In addition, the magnetic interference between the first magnet 124m and the second magnet 134m can be reduced and the degraded correcting accuracy can be restrained.

Figure 9:
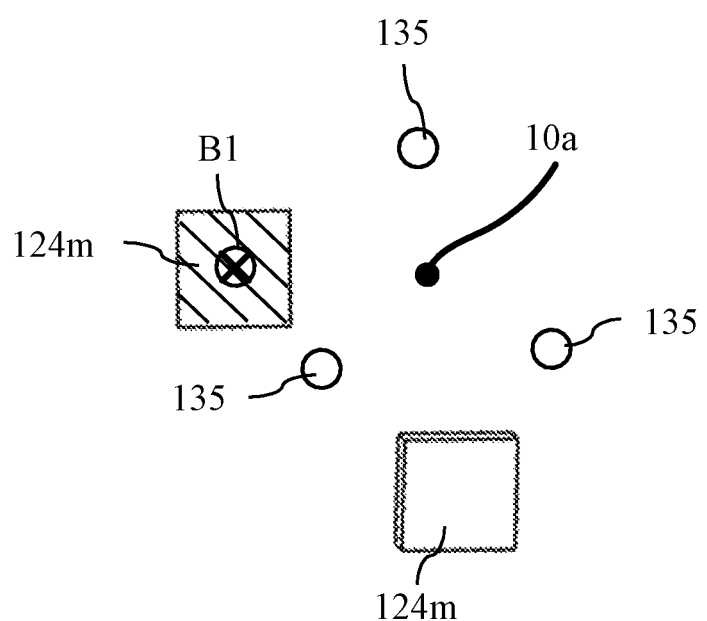
FIG. 9 is an explanatory view of a positional relationship between the first magnet in the first corrector and a biasing member in the second corrector according to this embodiment.

Referring now to FIG. 9, a description will be given of a positional relationship between the first magnet 124m in the first corrector 12 and the biasing member 135 (magnetic material) in the second corrector 13. FIG. 9 is an explanatory view of the positional relationship between the first magnet 124m and the biasing member 135, viewed from the magnetized direction (first magnetized direction B1) of the hatched first magnet 124m. FIG. 9 is a view viewed from the first magnetized direction B1, and the magnetic force is more influential on the area in the depth direction of the paper on the hatched part.

Accordingly, in this embodiment, the biasing member 135 is not disposed in an area onto which the external form of the first magnet 124m is projected in the first magnetized direction B1 (within the hatched part in FIG. 9). In other words, the biasing member 135 is disposed outside the area onto which the first magnet 124m is projected in the first magnetized direction B1 (outside the hatched part in FIG. 9). Thus, the magnetic force of the first magnet 124m is less influential on the biasing member 135.

Figure 10:
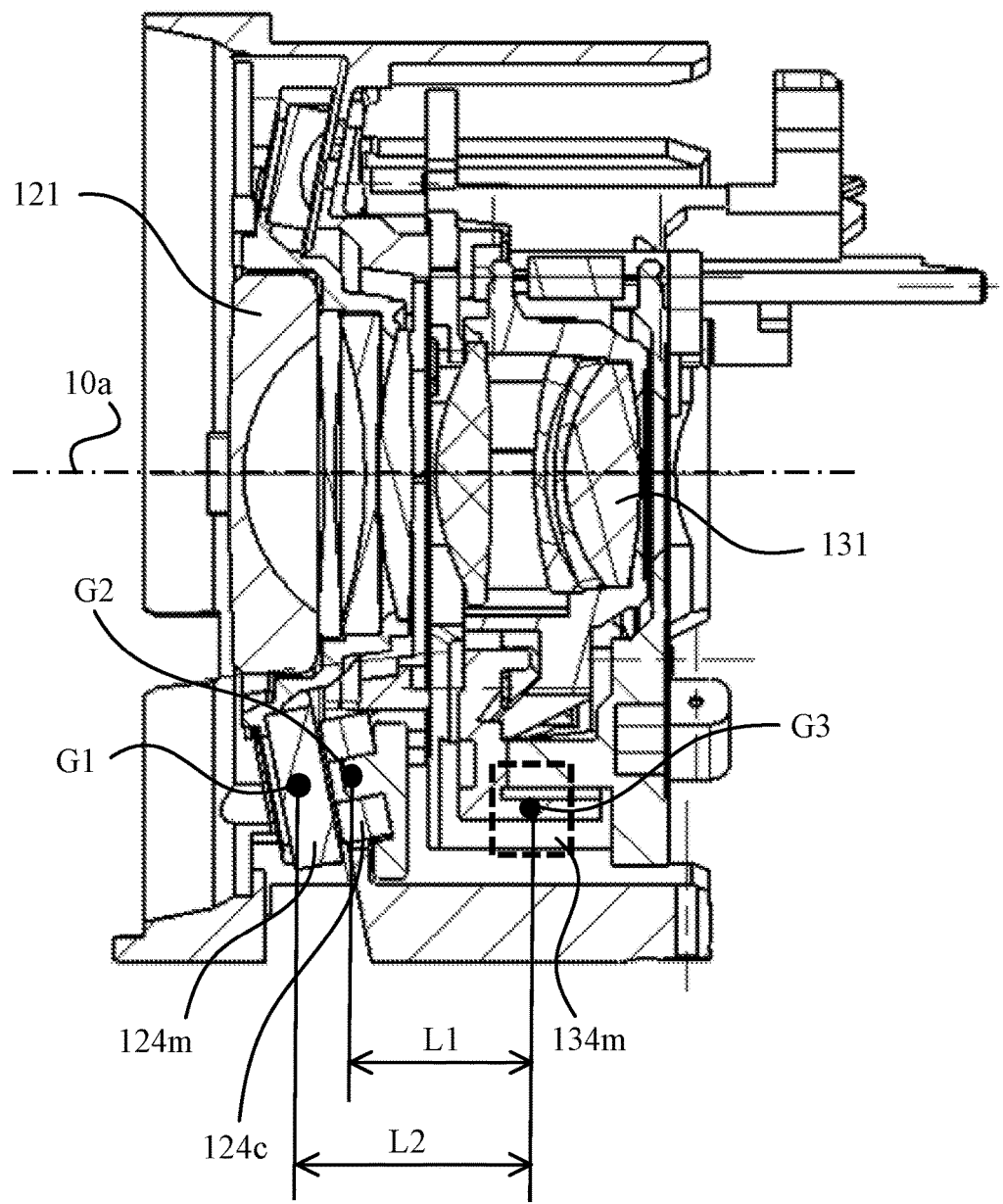
FIG. 10 is an explanatory view of a positional relationship between the first magnet and a first coil in the first corrector and the second magnet in the second corrector according to this embodiment.

Referring now to FIG. 10, a description will be given of a positional relationship among the first magnet 124m and the first coil 124c in the first corrector 12 and the second magnet 134m in the second corrector 13. FIG. 10 is an explanatory view illustrating the positional relationship among the first magnet 124m, the first coil 124c, and the second magnet 134m, which is a sectional view taken along the optical axis 10a in the first corrector 12 and the second corrector 13.

A distance L2 between a center G1 in the first magnet 124m and a center G3 in the second magnet 134m is longer than a distance L1 between a center G2 in the first coil 124c and a center G3 in the second magnet 134m (L1<L2). Thus, the magnetic interference between the first magnet 124m and the second magnet 134m can be reduced by increasing the distance between the first magnet 124m and the second magnet 134m.

Figure 6:
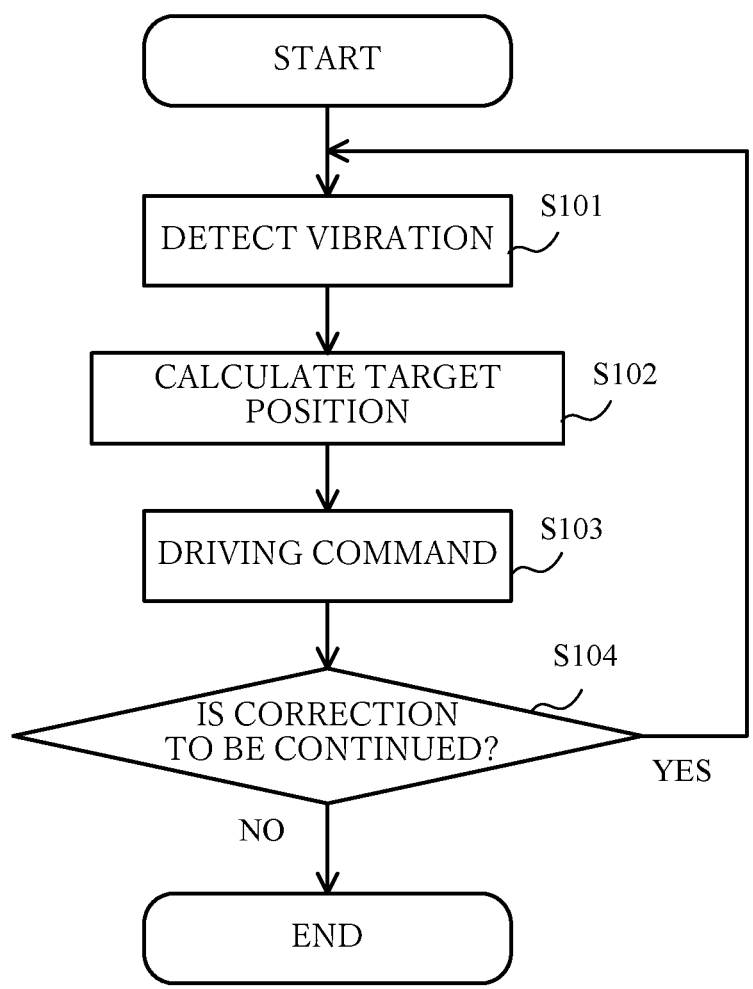
FIG. 6 is a flowchart illustrating an operation in the image stabilization apparatus according to this embodiment.

Referring now to FIG. 6, a description will be given of the operation (the image stabilizing operation) of the image stabilization apparatus 11 according to this embodiment. FIG. 6 is a flowchart illustrating an operation of the image stabilization apparatus 11. Each step in FIG. 6 is executed based on a command from the CPU 25 in the imaging apparatus 1.

Initially, in the step S101, the CPU 25 detects the vibration of the imaging apparatus 1 by using the shake detector, such as an accelerometer and an angular acceleration meter. Alternatively, the CPU 25 may calculate a moving amount of an object image (motion vector) based on an output signal (captured image data) from the imaging unit 21 (image sensor), and detect the moving amount as a vibration (image blur).

Next, in the step S102, the CPU 25 calculates a target position of the image stabilization apparatus 11 necessary to prevent or reduce an image blur based on the vibration detected in the step S102. The image stabilization apparatus 11 includes the first corrector and the second corrector 13. Thus, the CPU 25 calculates the target position for each of the first corrector 12 and the second corrector 13. In the image blur correction, as described later, the CPU 25 operates only the first corrector 12 according to the focal length and prohibits the second corrector 13 from operating.

Next, in the step S103, the CPU 25 outputs a driving command (control signal) to each of the first corrector 12 and the second corrector 13, and moves the first optical element 121 and the second optical element 131 so as to correct the image blur. Next, in the step S104, the CPU 25 determines whether the image blur correction is to be continued based on the command from the user or the CPU 25. When the image blur correction is to be continued, the flow returns to the step S101 and repeats the steps S101 to S104. The flow ends when the image blur correction is not to be continued.

Figure 7A:
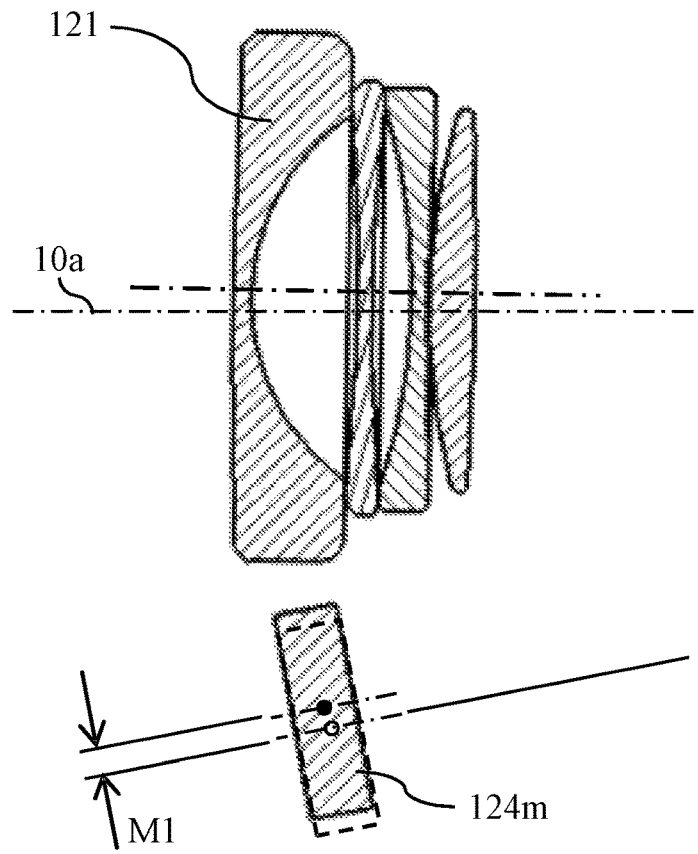
FIGS. 7A and 7B are explanatory views of a corrective operation by the first corrector according to this embodiment.
Figure 7B:
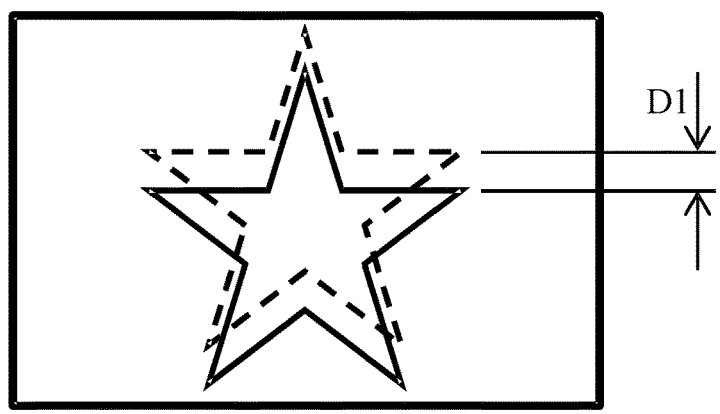
Figure 8A:
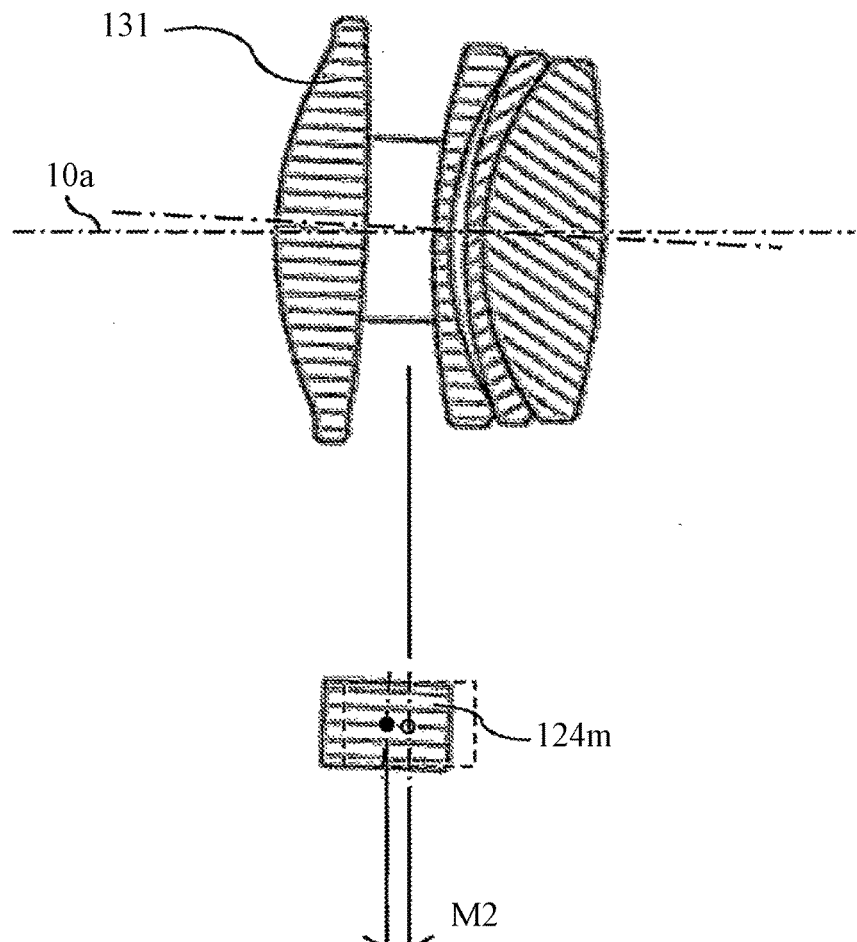
FIGS. 8A and 8B are explanatory views of a corrective operation by the second corrector according to this embodiment.
Figure 8B:
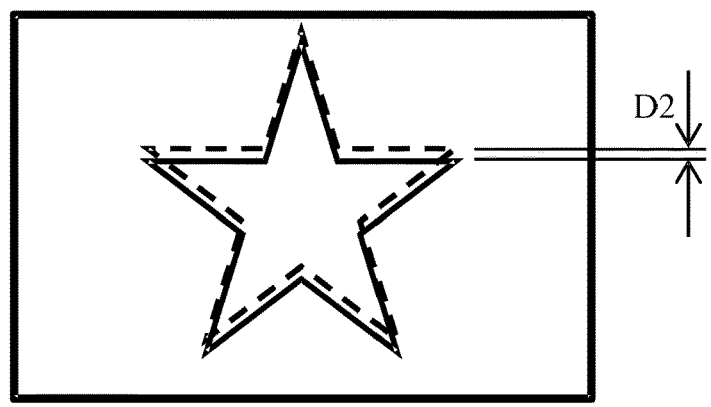

Referring now to FIGS. 7A, 7B, 8A, and 8B, a description will be given of concrete correction operations by the first corrector 12 and the second corrector 13 according to this embodiment. FIGS. 7A and 7B are explanatory views of the correction operation of the first corrector 12. FIG. 7A is a sectional view when the first optical element 121 is moved by the operation of the first corrector 12, and FIG. 7B illustrates a moving amount of the image (object image) by the operation of the first corrector 12. FIGS. 8A and 8B are explanatory views of the correction operation of the second corrector 13. FIG. 8A is a sectional view when the second optical element 131 is moved by the operation of the second corrector 13, and FIG. 8B illustrates a moving amount of the image (object image) by the operation of the second corrector 13.

Referring now to FIGS. 7A and 7B, the corrective operation of the first corrector 12 will be described. Assume that as illustrated in FIG. 7A, the driving force is generated by the electromagnetic action of the first driver 124 and the first magnet 124m is moved by a first magnet moving amount M1. Since the first magnet 124m moves along the spherical surface with the first radius R1, the first optical element 121 translates or parallel moves (shifts) in the direction orthogonal to the optical axis 10a and rotates (tilts). Since the first radius R1 is much larger than the size of the first corrector 12, the first optical element 121 mainly shifts. This corrective operation moves the object image by the first image moving amount D1 as illustrated in FIG. 7B.

In general, as the optical element is significantly shifted, a light quantity shortage and a degraded optical aberration occur in an image formed by the transmitting light flux. The first corrector 12 reduces an image degraded by the optical aberration through shifting and tilting. As the first optical element 121 significantly shifts, the degradation of the image cannot be prevented or sufficiently reduced only by tilting the optical element 121. As the shift increases, the degradation of the image can be prevented or sufficiently reduced by the corrective operation of the second corrector 13 in addition to the corrective operation of the first corrector 12.

Next, referring now to FIGS. 8A and 8B, a description will be given of the corrective operation of the second corrector 13. Assume that as illustrated in FIG. 8A, the driving force is generated by the electromagnetic action of the second driver 134 and the second magnet 134m is moved by a second magnet moving amount M2. Since the second magnet 134m moves along the spherical surface with the second radius R2, the second optical element 131 translates or parallel moves (shifts) in the direction orthogonal to the optical axis 10a and rotates (tilts). Since the second center point 131c is located in the second corrector 13, the first radius R1 and the second radius R2 are different from each other. Since the second radius R2 is smaller than the first radius R1, the second optical element 131 mainly shifts. Hence, as described above, the optical aberration caused by the shift of the first corrector 12 can be corrected by tilting the second corrector 13. However, the second corrector 13 has a fine shift component. Thus, as illustrated in FIG. 8B, the object image is moved by the second moving amount D2 by the corrective operation of the second corrector 13.

In FIGS. 7A, 7B, 8A, and 8B, the first magnet moving amount M1 and the second magnet moving amount M2 are drawn with sizes equal to each other. In this state, the first image moving amount D1 is larger than the second moving amount D2. This is because the first corrector 12 mainly shifts and the second corrector 13 mainly tilts. The first corrector 12 is compared with the second corrector 13. Then, even when the magnets are moved by the same moving amounts, it is understood that their contribution amounts to the image movement are different. Thus, the first corrector 12 has a larger correcting effect of the optical aberration when the first corrector 12 has a large moving amount. Thus, when the correction can be provided by changing the focal length of the lens barrel 10 even when the first optical element 121 in the first corrector 12 has a small moving amount, the second corrector 13 may not be operated.

Figure 12:
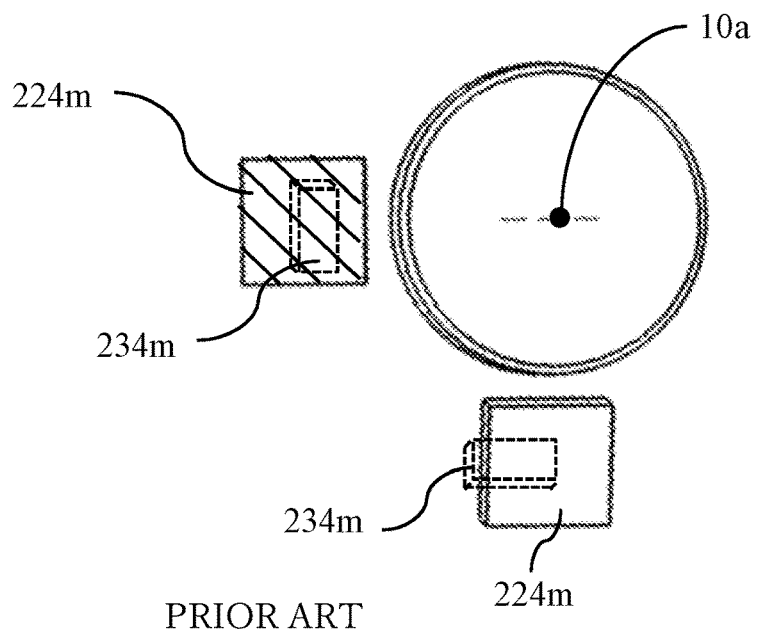
FIG. 12 is an explanatory view of the conventional image stabilization apparatus.
Figure 13:
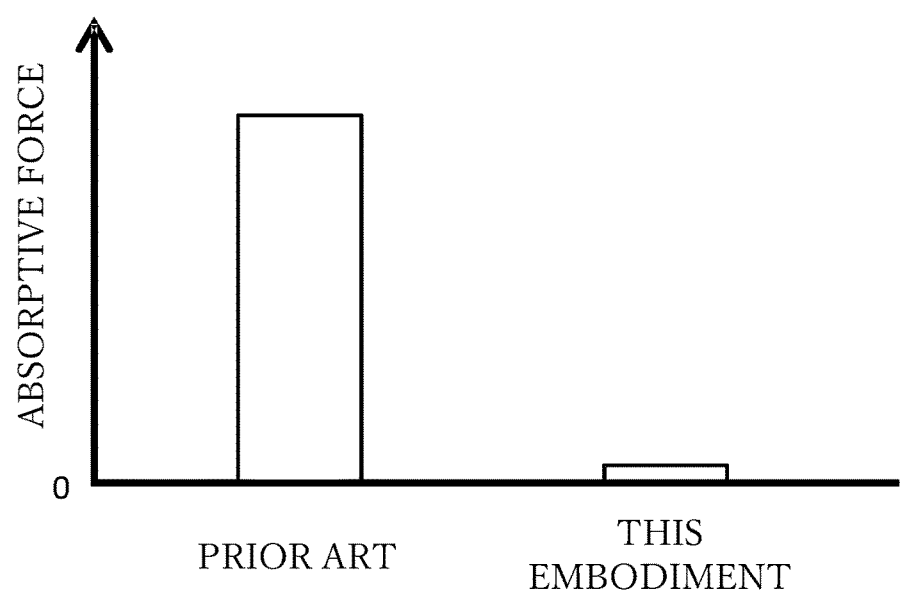
FIG. 13 is a comparative diagram of an absorptive force of the image stabilization apparatus between this embodiment and prior art.

Referring now to FIGS. 12 and 13, a description will be given of the effect of this embodiment. FIG. 12 is an explanatory view of the image stabilization apparatus according to prior art, and illustrates one of the hatched first magnets 224m viewed from the magnetized direction. The second magnet 234m is located in an area onto which the external form of the first magnet 224m is projected in the magnetized direction (in the hatched area in FIG. 12), and is different from the positional relationship between the first magnet 124m and the second magnet 134m according to this embodiment.

FIG. 13 is a comparative diagram of the absorptive force in the image stabilization apparatus between this embodiment and prior art, and illustrates the absorptive force applied between the first magnet 224m and the second magnet 234m in the prior art and the absorptive force applied between the first magnet 124m and the second magnet 134m in this embodiment. As illustrated in FIG. 13, this embodiment can make the absorptive force much smaller than the prior art. When the applied absorptive force is large between the magnets, the control can be hindered when each magnet is driven by the magnetic operation. Thus, in this embodiment in which the applied absorptive force is small, the uncontrollable cause is reduced and the degraded corrective accuracy can be restrained. Thus, this embodiment can provide an image stabilization apparatus, a lens apparatus, and an imaging apparatus, which can reduce the magnetic interference among a plurality of corrective lens units and restrain the degraded corrective accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-173261, filed on Sep. 6, 2016, which is hereby incorporated by reference herein in its entirety.

What is claimed is:
1. An image stabilization apparatus comprising:
a first optical element including a first lens and being configured to move in a direction different from an optical axis;
a first driver including a first magnet magnetized in a first magnetized direction and a first coil and being configured to drive the first optical element by an electromagnetic action;
a second optical element including a second lens and being configured to move in a direction different from the optical axis; and
a second driver including a second magnet magnetized in a second magnetized direction and a second coil and being configured to drive the second optical element by an electromagnetic action,
wherein the first magnet is disposed outside a second area onto which the second magnet is projected in the second magnetized direction and the second magnet is disposed outside a first area onto which the first magnet is projected in the first magnetized direction, and wherein a distance of closest approach between the first magnet and the second magnet is longer than (a) a distance of closest approach between the first magnet and the second optical element when the image stabilization apparatus is not operated or (b) a distance of closest approach between the first optical element and the second magnet in an optical axis direction when the image stabilization apparatus is not operated.

2. The image stabilization apparatus according to claim 1, wherein the first magnet is not disposed in the second area and the second magnet is not disposed in the first area.

3. The image stabilization apparatus according to claim 1, wherein the first driver includes two pairs of the first magnet and the first coil, and the second driver includes two pairs of the second magnet and the second coil, and
wherein one of the first magnets is disposed between the two second magnets and one of the second magnets is disposed between the two first magnets, when viewed from an optical axis direction.

4. The image stabilization apparatus according to claim 3, wherein the two first magnets form an angle of 90° and the two second magnets form an angle of 90° when viewed from the optical axis direction.

5. The image stabilization apparatus according to claim 1, wherein the first magnet moves along a spherical surface with a first radius and a first center point as a center located on the optical axis, and the second magnet moves along a spherical surface with a second radius different from the first radius and a second center point as a center located on the optical axis.

6. The image stabilization apparatus according to claim 5, wherein the first magnetized direction is a direction from the first magnet to the first center point, and the second magnetized direction is a direction from the second magnet to the second center point.

7. The image stabilization apparatus according to claim 1, wherein a distance between the first magnet and the second magnet is longer than a distance between the first coil and the second magnet in the optical axis direction.

8. The image stabilization apparatus according to claim 1, wherein the distance of closest approach between the first magnet and the second magnet is longer than the distance of closest approach between the first magnet and the second optical element in an optical axis direction when the image stabilization apparatus is not operated.

9. The image stabilization apparatus according to claim 1, wherein the distance of closest approach between the first magnet and the second magnet is longer than the distance of closest approach between the first optical element and the second magnet in an optical axis direction when the image stabilization apparatus is not operated.

10. The image stabilization apparatus according to claim 1, further comprising a magnetic material configured to move as the second optical element moves, wherein the magnetic material is disposed outside the first area.

11. The image stabilization apparatus according to claim 1, further comprising:
a light shielding member configured to move in a direction different from the optical axis and to shield light; and
a third driver including a third magnet magnetized in a third magnetized direction and a third coil and configured to drive the light shielding member by an electromagnetic action,
wherein the second magnet is disposed outside a third area onto which the third magnet is projected in the third magnetized direction and the third magnet is disposed outside the second area onto which the second magnet is projected in the second magnetized direction.

12. A lens apparatus comprising an image stabilization apparatus,
wherein the image stabilization apparatus includes:
a first optical element including a first lens and being configured to move in a direction different from an optical axis;
a first driver including a first magnet magnetized in a first magnetized direction and a first coil and being configured to drive the first optical element by an electromagnetic action;
a second optical element including a second lens and being configured to move in a direction different from the optical axis; and
a second driver including a second magnet magnetized in a second magnetized direction and a second coil and being configured to drive the second optical element by an electromagnetic action,
wherein the first magnet is disposed outside a second area onto which the second magnet is projected in the second magnetized direction and the second magnet is disposed outside a first area onto which the first magnet is projected in the first magnetized direction, and
wherein a distance of closest approach between the first magnet and the second magnet is longer than (a) a distance of closest approach between the first magnet and the second optical element when the image stabilization apparatus is not operated or (b) a distance of closest approach between the first optical element and the second magnet in an optical axis direction when the image stabilization apparatus is not operated.

13. An imaging apparatus comprising a lens apparatus that includes an image stabilization apparatus,
wherein the image stabilization apparatus includes:
a first optical element including a first lens and being configured to move in a direction different from an optical axis;
a first driver including a first magnet magnetized in a first magnetized direction and a first coil and being configured to drive the first optical element by an electromagnetic action;
a second optical element including a second lens and being configured to move in a direction different from the optical axis; and
a second driver including a second magnet magnetized in a second magnetized direction and a second coil and being configured to drive the second optical element by an electromagnetic action,
wherein the first magnet is disposed outside a second area onto which the second magnet is projected in the second magnetized direction and the second magnet is disposed outside a first area onto which the first magnet is projected in the first magnetized direction, and
wherein a distance of closest approach between the first magnet and the second magnet is longer than (a) a distance of closest approach between the first magnet and the second optical element when the image stabilization apparatus is not operated or (b) a distance of closest approach between the first optical element and the second magnet in an optical axis direction when the image stabilization apparatus is not operated.

14. An image stabilization apparatus comprising:
a first optical element including a first lens and being configured to move in a direction different from an optical axis;

a first driver including a first magnet magnetized in a first magnetized direction and a first coil and being configured to drive the first optical element by an electromagnetic action;

a second optical element including a second lens and being configured to move in a direction different from the optical axis; and a second driver including a second magnet magnetized in a second magnetized direction and a second coil and being configured to drive the second optical element by an electromagnetic action, wherein the first magnet is disposed outside a second area onto which the second magnet is projected in the second magnetized direction and the second magnet is disposed outside a first area onto which the first magnet is projected in the first magnetized direction, and wherein the first magnet moves along a spherical surface with a first radius and a first center point as a center located on the optical axis, and the second magnet moves along a spherical surface with a second radius different from the first radius and a second center point as a center located on the optical axis.

15. An image stabilization apparatus comprising:

a first optical element including a first lens and being configured to move in a direction different from an optical axis;

a first driver including a first magnet magnetized in a first magnetized direction and a first coil and being configured to drive the first optical element by an electromagnetic action;

a second optical element including a second lens and being configured to move in a direction different from the optical axis;

a second driver including a second magnet magnetized in a second magnetized direction and a second coil and being configured to drive the second optical element by an electromagnetic action;

a light shielding member configured to move in a direction different from the optical axis and to shield light; and a third driver including a third magnet magnetized in a third magnetized direction and a third coil and being configured to drive the light shielding member by an electromagnetic action, wherein the first magnet is disposed outside a second area onto which the second magnet is projected in the second magnetized direction and the second magnet is disposed outside a first area onto which the first magnet is projected in the first magnetized direction, and wherein the second magnet is disposed outside a third area onto which the third magnet is projected in the third magnetized direction and the third magnet is disposed outside the second area onto which the second magnet is projected in the second magnetized direction.

* * * * *